United States Patent
Heil-Brice et al.

(10) Patent No.: US 8,996,064 B2
(45) Date of Patent: Mar. 31, 2015

(54) HEALTH RISK, MITIGATING, RETRACTABLE, WIRED HEADSET AND PROTECTIVE CASE PLATFORM FOR WIRELESS COMMUNICATION DEVICES

(75) Inventors: Joan Lilia Heil-Brice, Irvine, CA (US); George Louis Carlo, Longboat Key, FL (US)

(73) Assignee: Safer Technologies, LLC, Carson City, NV (US)

( * ) Notice: Subject to any disclaimer, the term of this patent is extended or adjusted under 35 U.S.C. 154(b) by 301 days.

(21) Appl. No.: 13/559,106

(22) Filed: Jul. 26, 2012

(65) Prior Publication Data

US 2013/0029725 A1 Jan. 31, 2013

Related U.S. Application Data (60) Provisional application No. 61/513,198, filed on Jul. 29, 2011.

(51) Int. Cl.
  *H04B 1/38* (2006.01)
  *H04M 1/02* (2006.01)
  *H04M 1/15* (2006.01)

(52) U.S. Cl.
  CPC .............. *H04M 1/0258* (2013.01); *H04M 1/15* (2013.01)
  USPC ................. 455/557; 455/90; 455/66; 455/74; 455/575

(58) Field of Classification Search
  USPC ............................ 455/557, 90, 74, 575, 575.1
  See application file for complete search history.

(56) References Cited

U.S. PATENT DOCUMENTS

| 5,966,643 | A | * | 10/1999 | Radley .......................... 455/74.1 |
| 6,377,824 | B1 | | 4/2002 | Ingbir et al. |
| 6,631,279 | B2 | | 10/2003 | Rivera |
| 6,712,304 | B1 | | 3/2004 | Taylor |
| 6,825,810 | B2 | | 11/2004 | Ragner et al. |
| 7,031,657 | B2 | | 4/2006 | Tehrani |
| 7,039,435 | B2 | | 5/2006 | McDowell et al. |
| 7,151,912 | B1 | | 12/2006 | Morrison |
| 7,257,422 | B2 | | 8/2007 | Loprete |
| 8,600,461 | B2 | | 12/2013 | Kroupa |
| 2002/0052216 | A1 | | 5/2002 | Song |
| 2002/0090981 | A1 | | 7/2002 | Bae |
| 2002/0127974 | A1 | | 9/2002 | Song |
| 2003/0022632 | A1 | * | 1/2003 | Bernhart ........................ 455/90 |
| 2008/0238366 | A1 | * | 10/2008 | Kohata .......................... 320/115 |
| 2010/0151922 | A1 | * | 6/2010 | Zheng ........................ 455/575.1 |

(Continued)

FOREIGN PATENT DOCUMENTS

| GB | 2367443 | * | 4/2000 | ............... H04R 1/10 |
| GB | 2476321 | A | | 6/2011 | |

(Continued)

Primary Examiner — Fayyaz Alam
Assistant Examiner — Max Mathew
(74) Attorney, Agent, or Firm — Barnes & Thornburg LLP (57) ABSTRACT

A method and apparatus for mitigating health risk from cell phone usage wherein a cell phone having a source of radiation generating excitatory radiation toward brain tissue and an earphone electrically connected to the cell phone via a cord of sufficient length to permit the cell phone to be located more than ten inches from brain tissue during operation of the cell phone. An automatic shutoff mechanism preventing operation of the cell phone unless the cord is extended at least ten inches whereby the excitatory radiation is at a sufficient distance from the brain tissue to prevent brain tissue damage from the excitatory radiation.

20 Claims, 8 Drawing Sheets

(56) References Cited

U.S. PATENT DOCUMENTS

| | | | |
|---|---|---|---|
| 2011/0139918 A1* | 6/2011 | Chen | 242/371 |
| 2011/0199276 A1* | 8/2011 | Gruzberg | 343/841 |
| 2011/0203954 A1 | 8/2011 | Kroupa | |
| 2011/0233155 A1* | 9/2011 | Hui | 211/26 |
| 2011/0286621 A1* | 11/2011 | Zheng | 381/380 |
| 2012/0207318 A1* | 8/2012 | Tsuchiya et al. | 381/71.6 |
| 2013/0029725 A1* | 1/2013 | Heil-Brice et al. | 455/557 |
| 2013/0181805 A1* | 7/2013 | Saito et al. | 336/84 M |
| 2014/0014732 A1* | 1/2014 | Finn et al. | 235/492 |

FOREIGN PATENT DOCUMENTS

| | | |
|---|---|---|
| SU | 472475 A1 | 5/1975 |
| WO | 2013/166326 A1 | 11/2013 |

* cited by examiner

HEALTH RISK, MITIGATING, RETRACTABLE, WIRED HEADSET AND PROTECTIVE CASE PLATFORM FOR WIRELESS COMMUNICATION DEVICES

This application claims priority under 35 U.S.C. 119(e) to U.S. Provisional Application No. 61/513,198 filed 29 Jul. 2011. The contents of U.S. Provisional Application No. 61/513,198 is hereby incorporated by reference herein.

BACKGROUND OF THE INVENTION

Wireless communication devices, including cell phones, mobile phones and other smart communication devices, operate by inducing movement of various forms of electromagnetic waves that carry packeted information including voice and data. These devices also produce radiation. Medical science accumulated over the past 15 years confirms health risks from the certain combinations of energy waves producing electromagnetic radiation from such device use. For example, brain cancer risk increases, especially after ten years of cell phone use. There is a pronounced five-fold increase in brain cancer when use begins in the teenage years and such use increases risk of benign tumors of the brain, tumors of the acoustic nerve, and tumors of the eyes.

There are also documented health risks from non-cancer conditions. For example, cell phone use has been reported to increase risk of impairment such as: anxiety disorders, sleep disorders, memory disorders, electro-hypersensitivity, learning disorders, Autism, ADD, ADHD, temper disorders and other behavioral disorders.

As used in this application, a cell phone is any device that can make and receive telephone calls, carrying voice or data, over any system that includes a wireless radio link. As is well known, such devices are useful while moving from place to place. Cell phones as used herein also include mobile devices that receive and transmit video and text. A battery that may be rechargeable provides power for the cell phone functions. The cell phone includes an input mechanism (keypads, touch-screen, etc.) that operates the cell phone functions.

There is also medical evidence that people with other health conditions not necessarily caused by cell phone exposures are made worse by the exposures and the efficacy of medicines used to treat medical conditions are sometimes rendered less effective when there is cell phone exposure.

Cell phone use while driving has been linked to dramatic increase in automobile accidents and fatalities. Twenty-seven states in the U.S. have mandated the use of headsets on cell phones to protect against accident risk.

During the past five years, both the U.S. House of Representatives and the Senate have held hearings on cell phone health and safety dangers.

There are at present personal injury and product liability cases moving through the Courts in the United States, Europe and Israel, brought by plaintiffs who suffer from brain tumors whose cause they ascribe to their cell phone use.

In several states in the U.S., legislation has been introduced or otherwise considered that would affix health risk warning labels on cell phones with admonitions to use headsets as one risk mitigation step.

The equivalent of the Senate in France is considering legislation that would restrict promotion and sale of cell phones and other wireless devices to children and would require headsets to be included in each phone sold.

The scientific literature addressing the underlying health risks ascribed to cell phone and wireless device use numbers more than 12,000 peer-reviewed papers and reports. Included are three books by G. Carlo. One of those, "Cell Phones: Invisible Hazards in the Wireless Age", a best-selling book published in 2001 and now printed in six languages, was the first to define a summary of the nature of cell phone radiation hazards for the non-scientific public. Among the recommendations made was the use of headsets.

In the United States and other countries around the world, there are emission standards that are intended to provide a margin of safety for cell phone users that are based on the heat-inducing intensity of the electromagnetic fields produced by cell phones. These standards are expressed in Specific Absorption Rate (SAR) units which represents the amount of radiation passing through a gram of tissue per unit of time. The present standard SAR is 1.6 watts per kilogram.

The nature of cell phone radiation and the emerging scientific literature makes clear that there are several mechanisms of harm active with respect to cell phone dangers. There is universal acceptance in the scientific literature that there are two distinct radiation plumes emitted by cell phones that carry different types of danger, as well as effects generated by electromagnetic radiation produced by the internal circuitry of the phones. The most serious is the so-called 'near-field plume', which is the result of the power surge necessary to carry cell phone signals to transmission base stations. There is also an ambient or 'far-field' plume that carries with it unique health risk considerations. The concern about radiation produced by the circuitry is direct-contact exposure that produces allergic reactions in susceptible and sensitive users.

There is near universal acceptance in the scientific literature that the dual waveform—temporally-coherent carrier wave and spatially-coherent modulated wave—that is necessary for communication of information through wireless signals, is responsible for the biological responses elicited by both plumes.

The special significance of the near-field plume is that it emanates in all directions from the cell phone antenna about six to ten inches, depending upon the type of phone, geographic location of the phone during a call, position of the phone during the call, and the characteristics of the user (for example, there is deeper penetration into the heads of children because of the different biological make-up of their growing brain tissues.).

The penetration of this biologically active near-field plume into the brain is uniquely dangerous to brain tissue because brain tissue is highly vulnerable to environmental stressors. Brain cells, unlike all other cells in the human body, have very limited capacity for adaptation and self-protection. Thus, the human skull has evolved as a protection against trauma and the blood-brain barrier has evolved as a protection against dangerous circulating chemical exposures. Scientific data show that dangers from cell phones include both direct adverse impact on brain cells and tissue and diminution in the effectiveness of protective mechanisms including impact on the integrity of both the skull and the blood-brain barrier.

The penetrating Information Carrying Radio Waves (ICRW) from wireless communication devices (a dual wave form with a high-frequency carrier signal and a low-frequency secondary wave caused by modulation techniques) represents an evolutionarily new environmental exposure phenomenon so humans have not yet evolved a natural protective system.

The need, therefore, is to protect sensitive brain tissue from the near-field plume of ICRW by moving the plume away from the brain tissue. This is called primary prevention in medical and public health jargon—eliminating the dangerous exposure. The present new headset is thus a means of primary prevention in this regard.

Since the middle 1990s, there have been various varieties of headsets available for wireless devices. However, consumer research indicates that the current wired headsets on the market are considered to be cumbersome—especially the wire which is inconvenient, non-stylist, flimsy and are not therefore used. If they are not used, they offer no public health and safety protection benefit.

The present invention addresses these practical concerns and seeks to present a new headset platform that is convenient, stylish, strong, durable, of high sound-quality, and transportable from one device type to another. The present invention is designed specifically to protect against near-field plume health and safety dangers, migration of circuitry-induced radiation that harms sensitive and susceptible users, and the effects of excursions of ambient electromagnetic radiation drawn into the bio-field of the cell phone user.

There are two general types of headsets on the market presently: wired headsets and wireless or BlueTooth headsets. In the preferred embodiment, the present disclosure is an improvement on wired headsets or earphones. However, both types have their problems which may be improved by this disclosure.

There are a number of manufacturers, with the largest market shares owned by Jabra and Plantronics. These companies carry both wired and wireless versions that are offered as 'conveniences' rather than 'safety features'. It is noteworthy that some companies in the wireless industry itself openly recognize cell phone dangers in their product literature. Some others indirectly infer the presence of cell phone dangers in their user manuals. In either case, they do recommend headsets as a 'convenience' while still recommending keeping the phone a safe distance from the head.

Thus, the invention distinguishes itself in use from the products of these manufacturers in that the platform design is specifically addressing the health and safety concerns while also improving on the convenience and usability aspects.

BlueTooth headsets do not address the safety issue because they are in themselves wireless devices that change the near-field plume penetration profile but do not eliminate exposure to the near-field plume as does the present disclosure. In addition, the BlueTooth headsets introduce an additional type of ICRW exposure by virtue of their operating wireless signal which connects to the cell phone itself. These devices also draw ambient electromagnetic radiation into the users bio-field. So in effect, they increase the health risks to some, as yet unknown, degree.

BRIEF DESCRIPTION OF THE INVENTION

As noted above, there are numerous variations and equivalents of the present invention that should be appreciated by those skilled in the art. The present invention is intended to encompass those equivalents and variations.

DETAILED DESCRIPTION OF THE INVENTION

Figure 1:
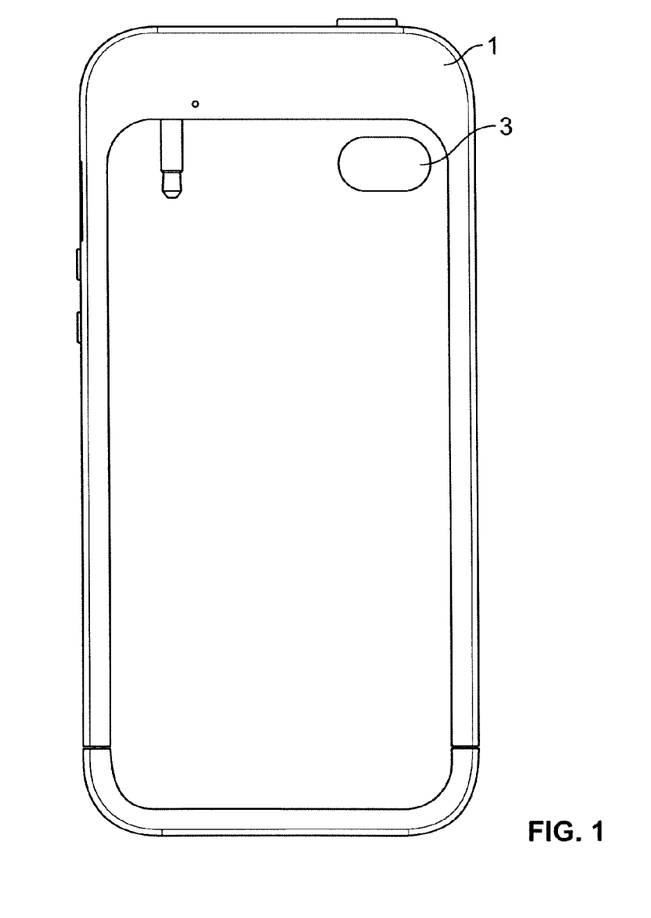
FIG. 1 is a planar view of the front of a case for a cell phone in accordance with this invention.
Figure 2:
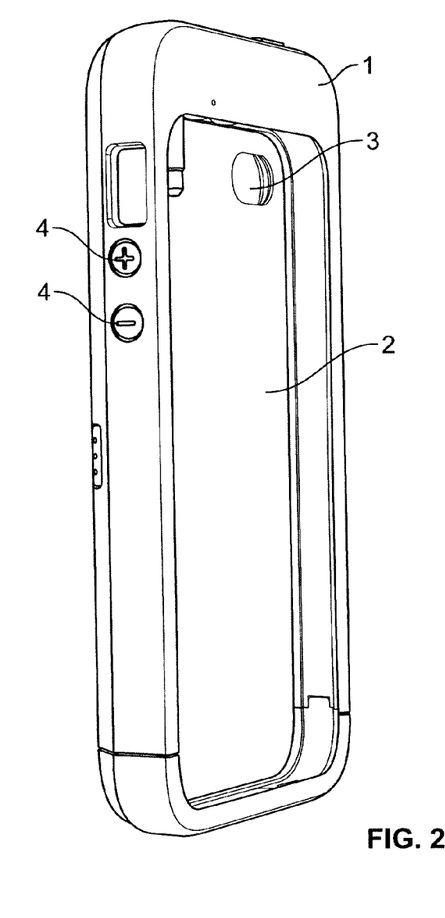
FIG. 2 is a perspective view of the cell phone case of FIG. 1 in accordance with this invention.

The present invention improves upon existing headsets in several ways, including the convenience and protection factors identified above. Cell phone case 1 seen in FIG. 1 with the compartment or space 2 for the cell phone being seen in FIG. 2 and with other optional features such as camera aperture 3 and optional buttons 4 for operation of the cell phone.

Figure 3:
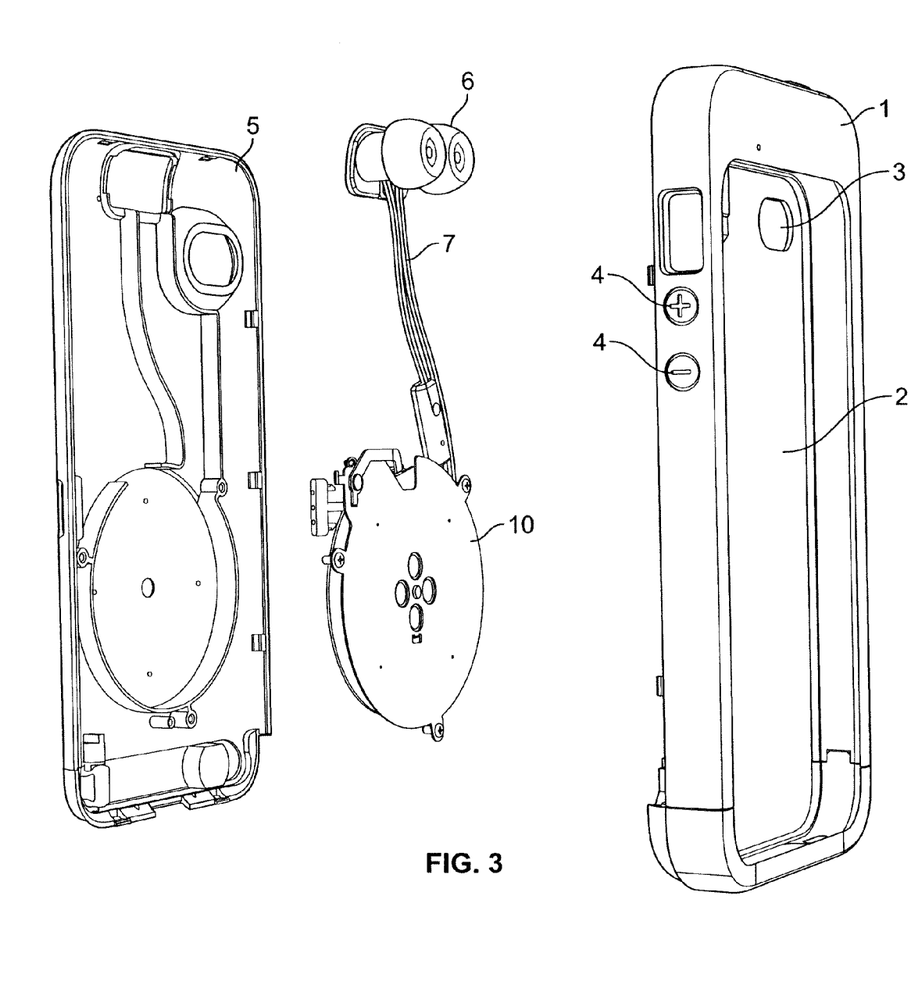
FIG. 3 is an exploded view of the cell phone case shown in FIG. 1 in accordance with this invention.

FIG. 3 shows the component parts of the cell phone cover 1 including the back central portion 5 of the cell phone cover with the supportive portions for the earplugs 6, electrical cord 7 and retractor mechanism 10.

Figure 4:
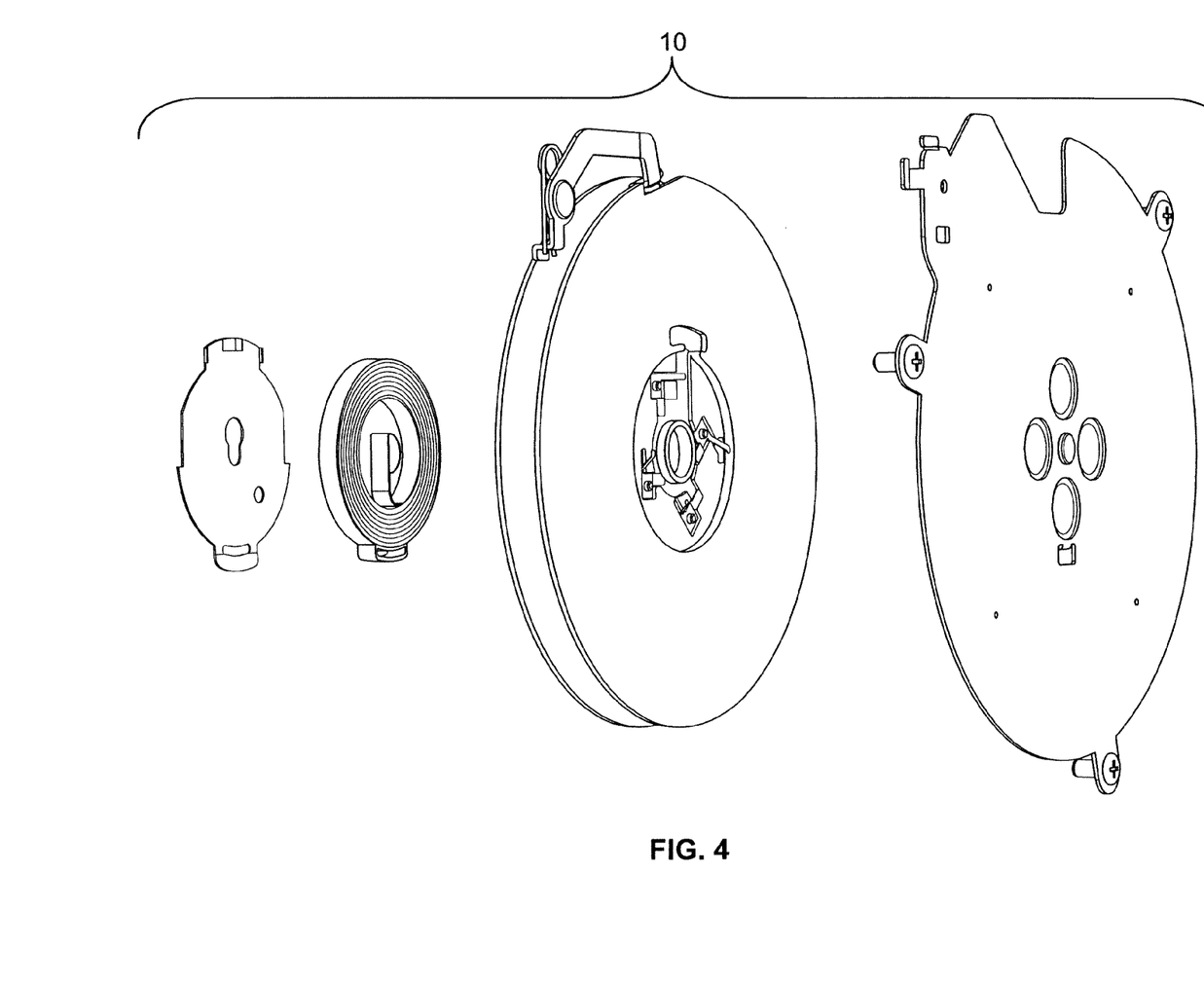
FIG. 4 is an exploded view of the distributor and retractor for cell phone case of FIG. 1 in accordance with this invention.
Figure 5:
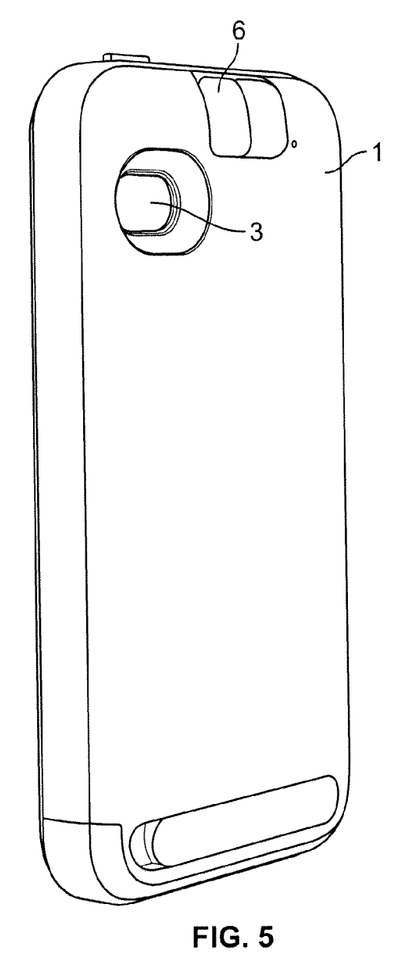
FIG. 5 is a perspective view of the back and side of the cell phone case of FIG. 1 showing the earplugs in their stored position.
Figure 6:
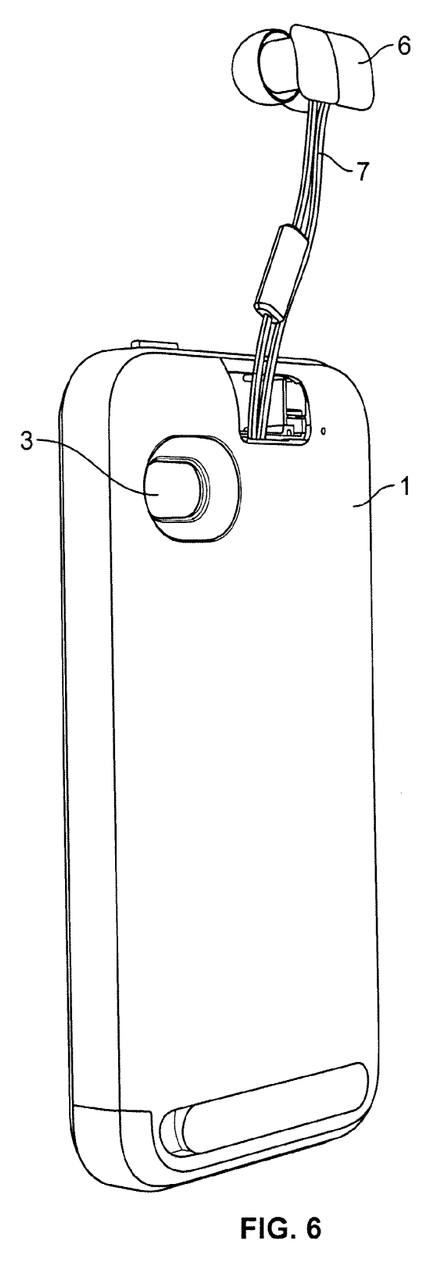
FIG. 6 is a perspective view of the back an side of the cell phone case of FIG. 1 showing the earplugs in an extended position.

FIG. 4 shows a retractor mechanism 10 for use to retract the cord 7 and earplugs 6 to a storage position of the cell phone case 1. As seen in FIG. 5 the cord 7 and earplugs 6 are retracted to the storage position. As seen in FIG. 6 the earplugs 6 are extended away from the cell phone (and case 1) and in accordance with the present invention the cell phone is operable when the earplugs 6 are extended sufficiently so that the cell phone is a safe distance from brain tissue of the user. It has been determined that a safe distance is about at least ten inches. That is, when the cell phone is at least ten inches from the skull of a person then the exposure to electromagnetic radiation is reduced sufficiently to avoid the presently known effects from such radiation. That is, a cell phone is a safe distance from the user's ear when it is more than about ten inches from the ear, which provides protection from the hazardous effects of the near-field plume.

Figure 7:
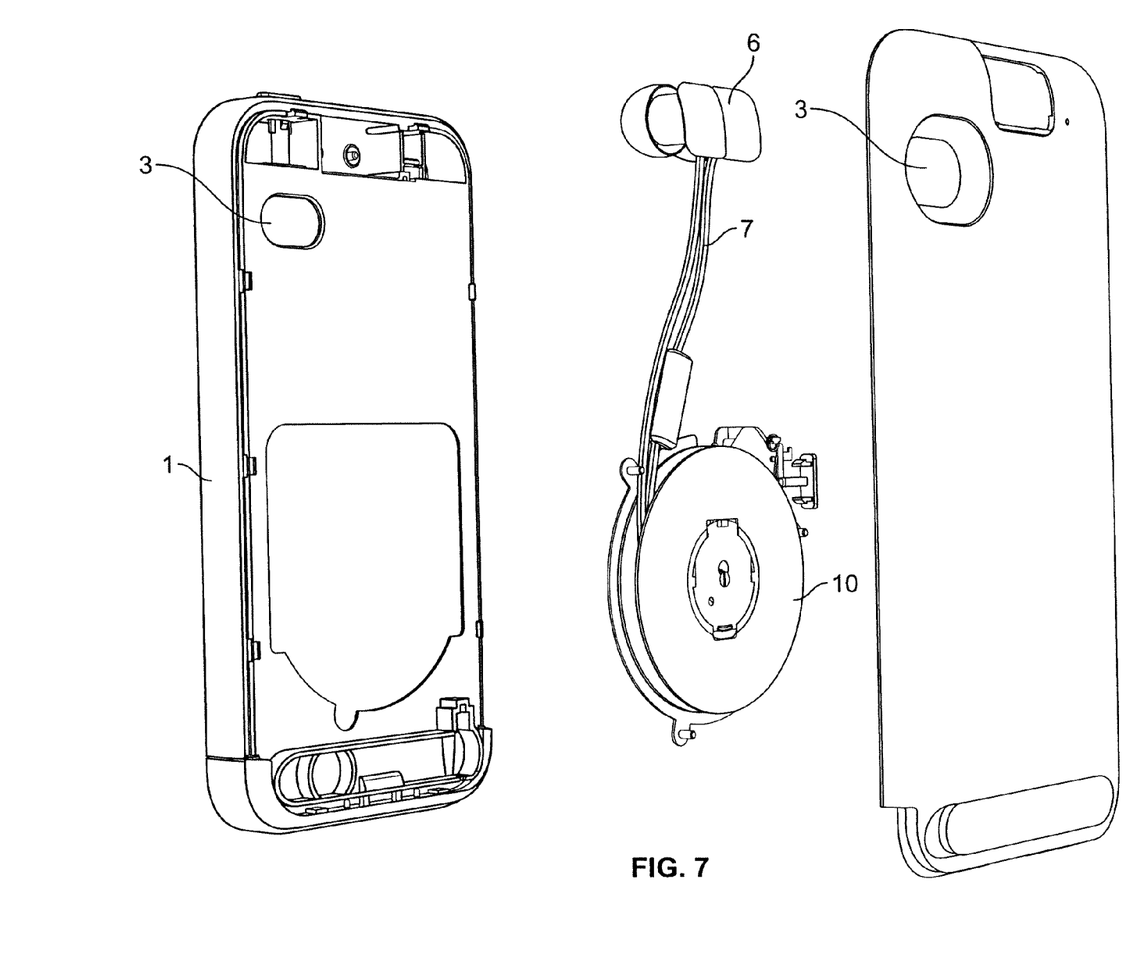
FIG. 7 is a second exploded view of the cell phone case of FIG. 1 in accordance with this invention.

FIG. 7 shows components of the cell phone case 1. As seen in FIG. 7, the back side of the case 1 comprises a generally flat plate section 8 with the case 1 having a second generally flat plate section 9 that is placed between generally flat plate section 8 and the cell phone compartment 2. The retractor mechanism 10 is a spring biased reel inside the case 1. The cord 7 may be manually pulled so that the cord 7 is unwound from the reel of the retractor 10. When it is desired to retract the earplug 6 a button (not shown) on the case is pressed to retract at least a portion of the cord 7 into the phone case. A ratchet or other type mechanism may be used to hold the cord 7 at the desired unwound position until the rewind button is pressed.

The cell phone has a connector for a plug-in (or similar) connection for an earphone (or earphones) for the cell phone. The case is provided with such connector or plug-in whereby the earplugs 6 are electronically connected to the cell phone. Accordingly, the cell phone is electronically attached to one end of the cord 7 whereby sound from the cell phone may be heard by a user when an earplug 6 is in a user's ear.

Figure 8:
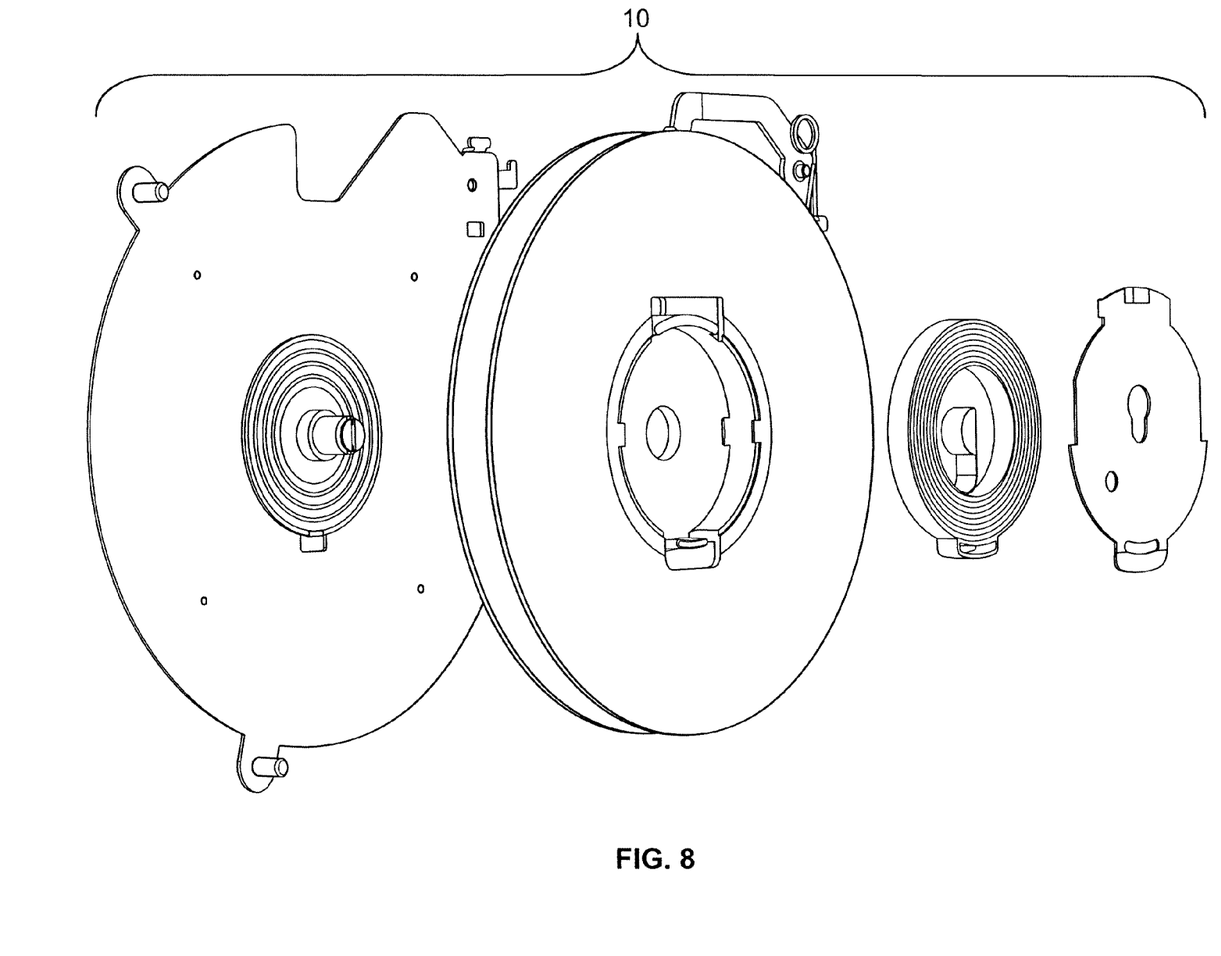
FIG. 8 is an exploded view of the distributor and retractor for cell phone case of FIG. 4, but from the opposite side.

FIG. 8 shows a cord retractor mechanism 10 from the opposite side shown in FIG. 4. As seen in FIG. 8, the retractor mechanism comprises a plate for mounting the retractor to the case 1 and the retractor.

Figure 9:
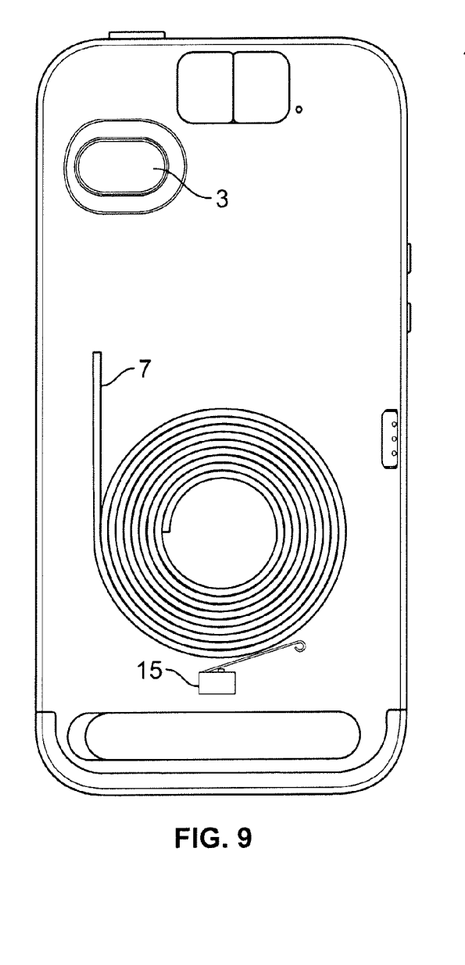
FIG. 9 is a planar view of back of the cell phone case of FIG. 1 showing the earplugs in their stored position.
Figure 10:
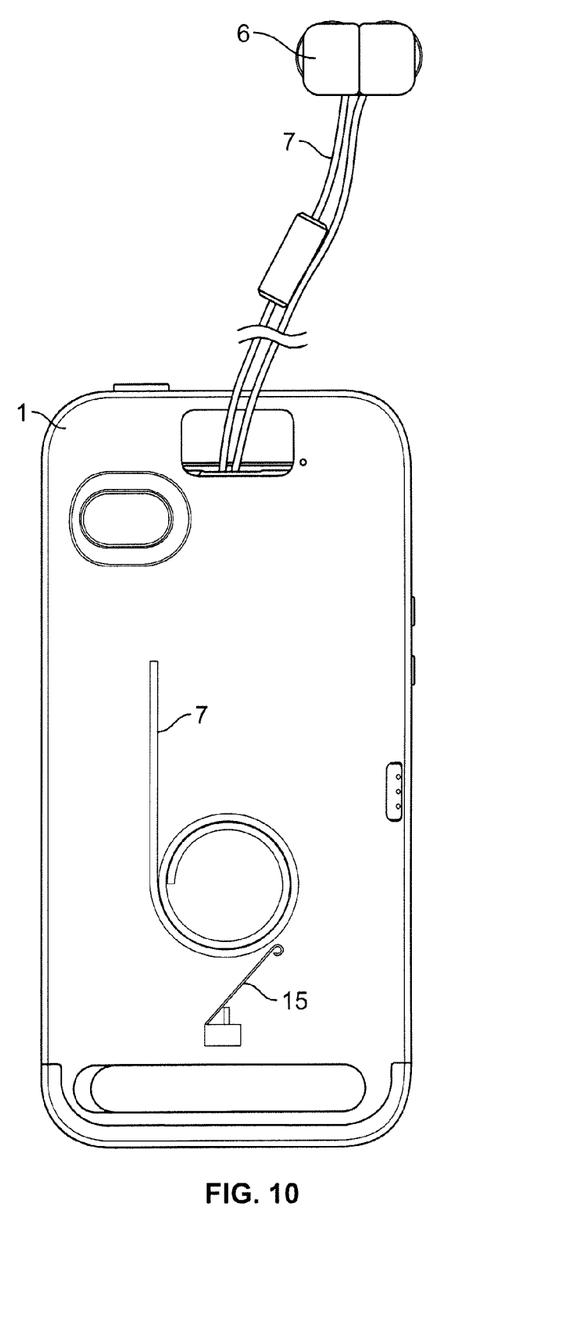
FIG. 10 is a planar view of back of the cell phone case of FIG. 1 showing the earplugs in an extended position.

FIG. 9 depicts the automatic shutoff mechanism in its operative position preventing operation of the cell phone because the cord is not extended at least ten inches. As seen in FIG. 9 switch 15 is forced into the shut-off position by virtue of the large circumference of the wound cord 7. By contrast, FIG. 10 shows the smaller circumference of the wound cord 7 whereby the switch 15 in its turned-on position permitting operation of the cell phone. The switch is connected to the power system of the cell phone so as to be able to permit the cell phone to be turned on when the earplugs are pulled out and at least ten inches of cord 7 is unwound whereby the switch is in the turned-on position of FIG. 10. Conversely, when the cord is retracted by mechanism 10 such that at least ten inches of cord does not extend from case 1 then switch 15 is forced into the shut-off position shown in FIG. 9 and the cell phone is not operable. That is, the earphone, when not in use, fits into a slot in a cell phone cover. As the user removes the earphone from the case the cord 7 begins to unreel from retractor 10. The retractor 10 being, for example, a spring driven reel that winds the wire 7 to retract the wire 7 and earpiece 6. The earpiece 6 is activated when the wire 7 is extended at least about ten inches as measured by, for example, the requisite number of revolutions of the reel that enables ten inches to be unwound. The switch is a hinge-like member that is spring loaded to bear against the coiled cord 7 and is thereby forced to its FIG. 9 position to turn off the cell phone and to its FIG. 10 position to turn on the cell phone.

In an alternative embodiment, the wire may include a member (not shown) fixed along the wire at a length whereby the when the wire 7 is being pulled out a sufficient distance (e.g., ten inches) the member passes, for example, the entrance to the case whereby the member trips a switch (not shown) and the cell phone and earpiece 6 are activated (or deactivated as the wire is being retracted and less than ten inches of wire 7 extends outside the case 1).

In yet another embodiment the cell phone may be placed in speaker mode whereby it is not necessary to hold the cell phone to the user's ear or to use the earplug 6 in order to speak and listen to the voice communication. In speaker mode the automatic shutoff mechanism permits operation of the cell phone regardless of whether the earphone is in the storage or use position.

Figure 11:
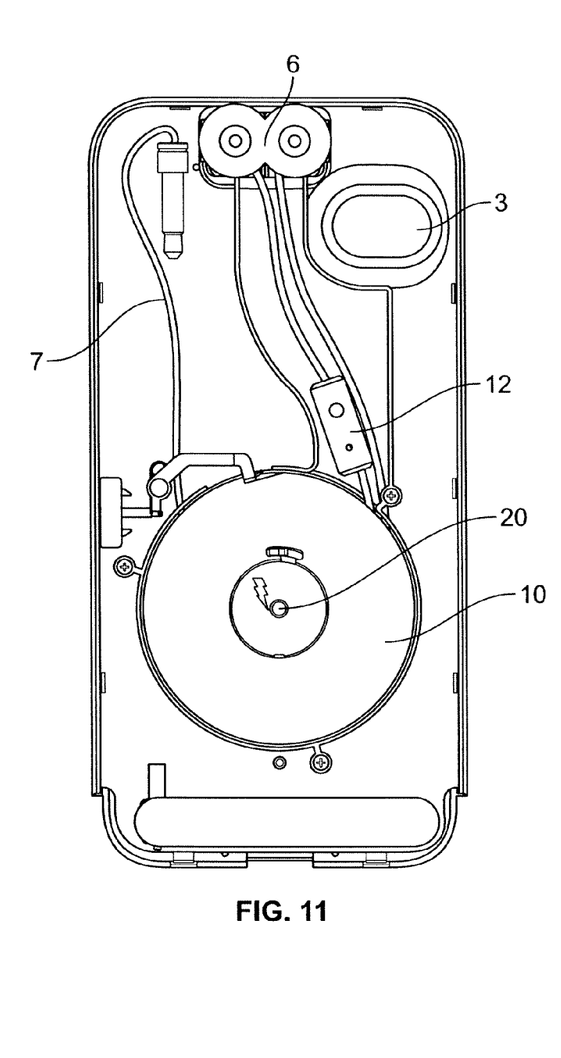
FIG. 11 is a planar view of the cell phone components inside the cell phone case of FIG. 1 showing a ferrite bead in accordance with the present invention.
Figure 12:
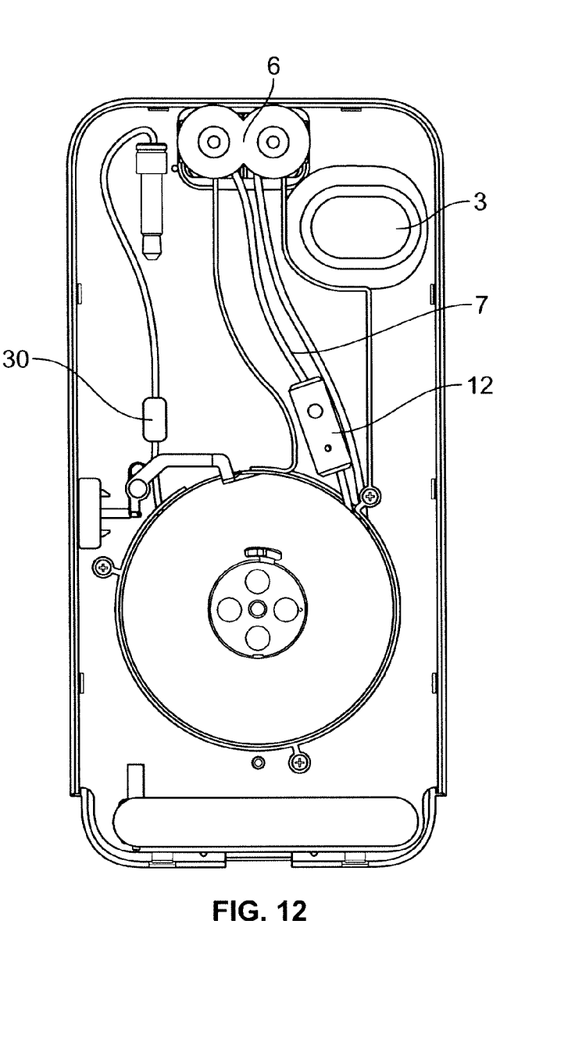
FIG. 12 is a planar view of the cell phone components inside the cell phone case of FIG. 1 showing a ferrite core in accordance with the present invention.

FIGS. 11 and 12 show another embodiment of the invention wherein the earplug 6 is enabled while harmful electromagnetic configurations within the cell phone are prevented from travelling up the cord or otherwise causing exposure to sensitive brain tissue. Both circuitry-induced and communication function radiation in the cell phone embedded in case 1 are dissipated by use of ferritic material. A ferrite bead is a wave dissipation tool. The positive charge on the ferrite bead 'grabs' onto the negative trough in a moving electromagnetic wave, provided that the wave has sufficient wavelength to allow for time-phase distinction between the positively and negatively charged aspects. Practically, this means ferrite impacts primarily lower frequency phenomena. For the purposes of the present application, that would include magnetic fields generated by cell phone electronics and secondary waves that are the result of modulation. The ferrite is less effective and perhaps ineffectual on high frequency waves which have very short wavelength. Thus, the ferrite does not help with some microwave frequencies or with some carrier wave components of ICRW (Information Carrying Radio Waves). Accordingly, the ferrite is not useful, in and of itself, as a protective tool against cell phone dangers. It has a very specific application, which is why it is included as an adjuvant, primarily to dissipate waves and excursion energy migrating up the speaker wire toward the brain from the phone. Secondarily, by preventing that migration, it effectively 'deadens' the wire so that it does not emit high enough energy to attract ambient waves into the bio-fields of the users.

By attaching to the negative trough, the ferrite bead positive energy, in effect, disrupts the electromagnetic wave by making it a 'random' or 'incoherent' wave. An incoherent or random wave does not have the ability to resonate with vibrational receptors that are tubulin protrusions from living cell membranes. Thus, the disrupted wave is not 'seen' by the cell membrane receptors and thus the biological effects cascade that leads to symptoms is not triggered.

In a preferred embodiment a solitary ferrite sphere is provided at or near the center of the unit, e.g., at or near the center of the retractor mechanism. This enables an omni-directional effect because the types of electromagnetic wave forms being targeted with the ferrite adjuvant is not from one source. Electromagnetic wave forms can come from many different places in the phone itself or from ambient sources. An oblong ferrite, or two spheres put side by side, are not as efficient because they are primarily bi-directional emitters requiring prediction of exactly where the waves would be coming from. An oblong or side by side configuration would be similar to a magnet, with the positive charges concentrating on one end or the other of the unit. With a sphere, the positive charges concentrate on the outside of the sphere and it can thus exert its desired, omni-directional effect.

In the preferred embodiment placement of the ferrite is within the cell phone case and preferably on the retractor mechanism 10 itself, or as near to the center of the cell phone case as possible. This placement will make it centrally located with regard to the electromagnetic field generator that is targeted—the phone that is encased by the cell phone case. Placement of the ferrite bead on the wire requires consideration of where on the wire 7 the ferrite bead is to be placed. If the ferrite bead is located near the earphone 6 and the wire is extended for use, then one of the important intervention functions of the bead itself may be diminished because there could be migration of energy up the wire as far as the ferrite bead, and therefore there is energy on the wire that could attract ambient EMR. Accordingly, placement of the bead on the wire needs to be at the end of the wire opposite the earphone so that it does not leave the central portion of the cell phone case when the wire 7 is extended.

As seen in FIG. 11, a ferrite bead 20 is positioned inside case 1 for dissipation of an electromagnetic field generated by the cell phone. Ferrite (a form of iron or iron alloy) is a positive ion material and a spherical ferrite bead (20) is effective to attract the negative ions of such electromagnetic field and thereby disrupt its configuration and cause dissipation. As seen in FIG. 12 a ferrite core 30 composed of preferably one ferrite bead 20, but possibly an arrangement of a plurality of ferrite beads 20 depending on the targeted electromagnetic field, may be used to dissipate the undesired electromagnetic field. It is important that the ferrite in the cell phone case 1 be spherical or generally spherical in order that it be operative to reduce the electromagnetic field. The size of the ferrite sphere is not critical since ferrite spheres greater than about 3 mm are not practical as they take up too much room in the case 1 and since ferrite spheres smaller than 3 mm are satisfactory to dissipate electromagnetic radiation. Thus, as discussed above, while the cord 7 attaches the cell phone at one end of the cord 7 and earphones 6 (earplugs) are located at the other end of the cord 7 a ferrite member 20 is provided intermediate the ends of the cord 7 for prevention of harmful electromagnetic radiation being transmitted along the cord 7.

FIGS. 11 and 12 also show microphone 12 which as depicted is useful to pick up and send voice communications while using the present invention. Obviously the microphone 12 may be placed otherwise with respect to the present cell phone case 1.

As noted above, there are numerous variations and equivalents of the present invention that should be appreciated by those skilled in the art. The present invention is intended to encompass those equivalents and variations.

What is claimed is:

1. A device for mitigating health risk from cell phone usage, comprising:
   a cell phone for receiving voice communications, the cell phone being operable by electric power and being capable of generating excitatory radiation;
   an earphone electrically connected to the cell phone via a cord of sufficient length to permit the cell phone to be located a safe distance from brain tissue during operation of the cell phone,
   a mechanism for winding the cord for storage and unwinding the cord for use of the earphone,
   an automatic shutoff mechanism preventing operation of the cell phone unless the cord is unwound at least a minimum distance, the shutoff mechanism comprising a switch movable to control the power depending on the diameter of wound cord engaging the switch,
   whereby a cell phone user is able to use the cell phone only when the cord is extended at least a minimum distance from the cell phone whereby the excitatory radiation of the cell phone is at a sufficient distance from the brain tissue to prevent brain tissue damage from the excitatory radiation.

2. The device of claim 1, wherein the cord is connected to a retractor mechanism to permit extension and unwinding of the cord for enabling use of the cell phone, and to permit winding and storage of the cord when the cell phone and cord are not in use, and wherein the switch is operable to determine when the amount of cord wound on the retractor mechanism is larger than a predetermined amount whereby the switch disables operation of the cell phone.

3. The device of claim 2, wherein the automatic shutoff mechanism comprises a switch coupled to the cord and operable to switch off the cell phone when the cord is wound in its storage position and to switch on the cell phone when at least ten inches of the cord has been unwound and extends from the cell phone.

4. The device of claim 2, wherein the switch is located so as to sense the circumference of the wound cord and to turn-on the cell phone when the circumference of the wound cord is below a predetermined circumference and to turn-off the cell phone when the circumference of the wound cord is above the predetermined circumference.

5. The device of claim 1, wherein the cell phone is only operable by use of the earphone.

6. The device of claim 1, wherein the automatic shutoff mechanism permits operation of the cell phone when the speaker mode is on and regardless of whether the earphone is in the storage or use position.

7. The device of claim 1, further comprising a ferrite sphere smaller than 3 mm.

8. A device for mitigating health risk from cell phone usage, comprising:
   a cell phone having a source of radiation to generate excitatory radiation toward brain tissue, the brain tissue generating responsive, disruptive energy in response to the excitatory radiation;
   an earphone and cord connecting the earphone to the cell phone whereby the cord is of sufficient length to permit the cell phone to be located a distance from brain tissue during operation of the cell phone whereby the user is not subjected to an unsafe amount of radiation,
   a phone case coupled to the cell phone and adapted to permit the phone to be used only in speaker mode or earplug mode,
   an earplug with a cord connecting the cell phone to the earplug,
   a retractor mechanism coupled to the phone case for retracting at least a portion of the cord into the phone case, the retractor mechanism being operable to permit the earplug to operate only when a minimum length of cord is outside the phone case,
   whereby a cell phone user is able to use the cell phone and phone case combination only by speaker or when the cord is extended at least a minimum length whereby the excitatory radiation is at a sufficient distance from the brain tissue to prevent brain tissue damage from the excitatory radiation, and
   further comprising a ferrite sphere located on the retractor mechanism inside the phone case.

9. The device of claim 8, wherein the minimum length is about ten inches.

10. The device of claim 8, further comprising a ferrite bead located on the cord to prevent harmful electromagnetic radiation from travelling up the cord to the earplug.

11. The device of claim 10, wherein the ferrite bead is a sphere smaller than 3 mm.

12. The device of claim 10, wherein the ferrite bead is located near the center of the phone case.

13. The device of claim 10, wherein a plurality of ferrite beads are located on the cord.

14. The device of claim 8, further comprising a plurality of ferrite beads each smaller than 3 mm and wherein the plurality of ferrite beads are adapted to minimize harmful electromagnetic radiation from the cell phone.

15. The device of claim 8, further comprising a button operable to retract at least a portion of the cord into the phone case.

16. A method for preventing passage of dangerous radiation generated by the internal circuitry of a cell phone comprising
   providing a cell phone and cell phone case for protecting at least a portion of the cell phone exterior,
   providing an earplug and a cord for electronically connecting the earplug to the cell phone via the cord,
   providing a retraction mechanism for winding the cord into the cell phone case whereby the earplug is retracted to a storage position,
   the earplug and retraction mechanism being located inside the cell phone case so that the cord can be wound into a maximum diameter coil when the earplug is retracted to a storage position on a rim of the case,
   providing the cord engaged with a switch, and
   enabling the cell phone by pulling the earplug at least a minimum distance away from its storage position on the cell phone case whereby the pulling unwinds the coiled cord which reduces the diameter of the remaining cord to a predetermined diameter that activates the switch to power the cell phone.

17. The method of claim 16 further comprising preventing passage of dangerous radiation generated by the internal circuitry of the phone by providing a spherical ferrite bead smaller than 3 mm inside the case whereby the bead is effective to counteract harmful negative ions of electromagnetics generated by the cell phone.

18. A device for mitigating health risk from cell phone usage, comprising:
- a cell phone for receiving voice communications, the cell phone being operable by electric power and being capable of generating excitatory radiation;
- an earphone electrically connected to the cell phone via a cord of sufficient length to permit the cell phone to be located a safe distance from brain tissue during operation of the cell phone,
- a mechanism for winding the cord for storage and unwinding the cord for use of the earphone,
- an automatic shutoff mechanism preventing activation of the earphone unless the cord is unwound at least a minimum distance, the shutoff mechanism comprising a switch movable to control the power activating the earphone depending on the diameter of wound cord engaging the switch,
- whereby a cell phone user is able to use the cell phone only when the cord is extended at least a minimum distance from the cell phone whereby the excitatory radiation of the cell phone is at a sufficient distance from the brain tissue to prevent brain tissue damage from the excitatory radiation.

19. The device of claim 18, further comprising a ferrite bead located on the cord to prevent harmful electromagnetic radiation from travelling up the cord to the earplug.

20. The device of claim 18, further comprising a plurality of ferrite beads each smaller than 3 mm and wherein the plurality of ferrite beads are adapted to minimize harmful electromagnetic radiation from the cell phone.

* * * * *